(12) United States Patent
Wang et al.

(10) Patent No.: US 11,686,018 B2
(45) Date of Patent: Jun. 27, 2023

(54) DEGRADABLE POLYESTER FIBER AND ITS PREPARATION METHOD

(71) Applicant: JIANGSU HENGLI CHEMICAL FIBRE CO., LTD., Wujiang (CN)

(72) Inventors: Shanshui Wang, Wujiang (CN); Hongwei Fan, Wujiang (CN); Fangming Tang, Wujiang (CN); Lili Wang, Wujiang (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 0 days.

(21) Appl. No.: 17/789,218

(22) PCT Filed: Jun. 11, 2020

(86) PCT No.: PCT/CN2020/095572
§ 371 (c)(1),
(2) Date: Jun. 27, 2022

(87) PCT Pub. No.: WO2021/135079
PCT Pub. Date: Jul. 8, 2021

(65) Prior Publication Data
US 2023/0030865 A1 Feb. 2, 2023

(30) Foreign Application Priority Data
Dec. 29, 2019 (CN) .......................... 201911386281.8

(51) Int. Cl.
*D01F 6/92* (2006.01)
*D01D 5/22* (2006.01)
(Continued)

(52) U.S. Cl.
CPC ............... *D01F 6/92* (2013.01); *D01D 5/088* (2013.01); *D01D 5/22* (2013.01); *D01D 10/02* (2013.01)

(58) Field of Classification Search
USPC ......... 428/373; 264/239; 528/272, 294, 354, 528/361, 363, 364, 365
See application file for complete search history.

(56) References Cited

U.S. PATENT DOCUMENTS 5,322,736 A    6/1994   Boyle et al.

FOREIGN PATENT DOCUMENTS

CN          102877143 A    1/2013
CN          106087098 A    11/2016
(Continued)

OTHER PUBLICATIONS

GB/T 6506-2001, Test method for crimp contraction properties of textured filament yarns, Textile Institute of Industrial Standardization, 2001, pp. 1-5.
(Continued)

*Primary Examiner* — Lynda Salvatore
(74) *Attorney, Agent, or Firm* — Bayramoglu Law Offices LLC

(57) ABSTRACT

A degradable polyester fiber and its preparation method are disclosed. The preparation method is to cool a PET melt dispersing with doped $ZrO_2$ powder by ring-blowing after extruded from a trilobal spinneret hole on a spinneret, and manufacture a fully drawn yarn (FDY) according to an FDY process with the PET melt, then the degradable polyester fiber is prepared after a relaxation heat treatment. The trilobal spinneret hole on the spinneret has three leaves with unequal lengths and angles, and all the trilobal spinneret holes are distributed in concentric circles, with a center line of the leaf opposite to the smallest angle in each trilobal spinneret hole passing through the center of the circle, and pointing away from the center of the circle. The process is simple, and the obtain fiber has good performances in degradation and elasticity.

16 Claims, 1 Drawing Sheet

(51) Int. Cl.
*D01D 5/088* (2006.01)
*D01D 10/02* (2006.01)

(56) References Cited

FOREIGN PATENT DOCUMENTS

| | | |
|---|---|---|
| CN | 106400166 A | 2/2017 |
| CN | 109722740 A | 5/2019 |
| CN | 111118650 A | 5/2020 |
| JP | S6285025 A | 4/1987 |

OTHER PUBLICATIONS

Rui Wang, et al., Preparation Technology of 3D Crimp Fiber, Foreign Views, 2017, pp. 136-139.

DEGRADABLE POLYESTER FIBER AND ITS PREPARATION METHOD

CROSS REFERENCE TO THE RELATED APPLICATIONS

This application is the national phase entry of International Application No. PCT/CN2020/095572, filed on Jun. 11, 2020, which is based upon and claims priority to Chinese Patent Application No. 201911386281.8, filed on Dec. 29, 2019, the entire contents of which are incorporated herein by reference.

TECHNICAL FIELD

The present invention belongs to the field of polyester fiber, and more particularly, relates to one type of degradable polyester fiber and its preparation method.

BACKGROUND

Chemical fiber, based on the development of organic synthetic chemistry and polymer chemistry in the 1920s, has become one of the most important roles of the industry just in a few decades with the output and applications far exceed those of natural fiber. Among them, polyester, nylon and acrylic fiber are the three major fibers in chemical fiber. Among these three fibers, because of the fastest development speed, the most extensive application and the highest output of polyester fiber, it is one of the most important textile materials. Polyester fiber is the largest variety of synthetic fiber, and is made of polyethylene terephthalate (PET) through the melt spinning and the after-treatment processes, whereas PET is synthesized from terephalic acid (PTA, or dimethyl terephalate, DMT) and ethylene glycol (EG) through the esterification (or transesterification) and the following polycondensation. As a semi crystalline polymer with good thermoplastic properties, PET has been widely used in various fields such as clothing, packaging, biology and manufacturing. However, with the rapid development of PET industry, although PET will not directly cause harm to the environment, the difficulties in the PET waste treatment can indirectly increase environmental pressure due to its huge amount and strong resistance to atmospheric and microbial degradation. At present, landfill, incineration and recovery are the main methods to treat PET waste, from the environmental protection point of view, landfill and incineration are easy but dirty. Conversely, the degradation recovery has been believed as an efficient and scientific treatment for PET waste. However, the tight structure, the high crystallinity and the long natural degradation time of PET bring much restriction to the degradation recovery, and the highest proportion of recycling for common PET fabric in U.S. is just about 13% whereas in China that is even low as 10%. In practical application, chemical degradation methods are mostly used for PET, including hydrolysis and alcoholysis, as well as ammonolysis, amination and pyrolysis, however, they are still far from solving the recycling of a large number of waste clothing because of the problems such as slow degradation rate and poor degradation effect.

Therefore, it is of great significance to develop one type of degradable polyester fiber with high degradation rate and high degradation efficiency.

SUMMARY

The primary object of the present invention is to provide one type of degradable polyester fiber and its preparation method, so as to overcome the inadequacies that the prior art cannot recycle part of polyester fibers.

To this end, the technical schemes of the invention are as follows:

The preparing method of a degradable polyester fiber is to cool a PET melt by ring-blowing after extruded from a trilobal spinneret hole on a spinneret; then manufacture a fully drawn yarn (FDY) according to an FDY process with the PET melt; after a relaxation heat treatment, the degradable polyester fiber is prepared;

wherein the PET melt disperses with doped $ZrO_2$ powder, which is obtained through a process of evenly mixing a $M^{x+}$ solution and a $Zr^{4+}$ solution at first, then dripping in a precipitant until a pH value is 9-10, and finally calcining the precipitate; wherein $M^{x+}$ is more than one ion selected from the group consisting of $Mg^{2+}$, $Li^+$ and $Zn^{2+}$;

wherein a ratio of angles between centre lines of three leaves from the same trilobal spinneret hole is 1.0:(1.5-3.1):(1.5-3.1); wherein the ratio of lengths of two leaves forming the smallest angle to the length of the other leaf from the same trilobal spinneret hole is 3:3:2; wherein the ratio of the length to the width of the shortest leaf is (1.5-2):1, with the same widths of other two leaves from the same trilobal spinneret hole; wherein the shapes and sizes of three leaves from different trilobal spinneret holes are the same;

wherein all the trilobal spinneret holes are distributed in concentric circles, with a center line of the leaf opposite to the smallest angle in each trilobal spinneret hole passing through the center of the circle, and pointing away from the center of the circle.

The principle of the present invention is as follows.

The preparing method of degradable polyester fiber is extruding a PET melt from a trilobal spinneret hole on a spinneret and then spinning it, wherein the PET melt disperses with doped $ZrO_2$ powder, wherein the degradation rate of polyester is accelerated through improving the oxygen reduction catalysis efficiency of $ZrO_2$ doped with the metal oxide (more than one of magnesium oxide, lithium oxide and zinc oxide) via solution blending, coprecipitation and calcination. $ZrO_2$, as an oxygen reduction catalyst substrate with high ionic conductivity, can form the stable cubic phase if doped with low valence metal ions ($Mg^{2+}$, $Li^+$ and $Zn^{2+}$). At the same time, to a certain extent, the closer the radius of doping ion is to the radius of doped ion, the more conducive to the formation of oxygen vacancies and the more conducive to the conduction of oxygen ion. Hence in the present invention the metal ions ($Mg^{2+}$, $Li^+$ and $Zn^{2+}$) with the same radius of $Zr^{4+}$ ion (0.103 nm) are selected as the doping ions to improve the conduction rate of oxygen ions and the degree of oxygen reduction reaction during the $Zr^{4+}$ catalyzed polyester degradation process;

wherein the prepared degradable polyester fiber is a trilobal profiled fiber, wherein the trilobal fiber has a larger surface area than a round fiber of the same denier, which is more conducive to oxygen ion conduction and enhances the degradation rate of the polyester.

The trilobal spinneret hole on the spinneret of this invention has three leaves with incompletely same lengths and incompletely same angles between them, wherein the center line of the leaf opposite to the smallest angle in each trilobal spinneret hole passes through the center of the circle, and points away from the center of the circle. The degradable polyester fiber is prepared through the spinneret and cooled by ring-blowing, wherein the cooling conditions of three leaves are seriously asymmetric and unbalanced, which makes the cooling speed of the melt at different positions in the cross-section different while extruding. During spinning, the cooling wind speed is between 1.80-2.30 m/s, wherein the high speed makes the part close to the air outlet cool faster, and the part far from the air outlet cool slower. When one of the three leaves of the trilobal spinneret hole directly facing the cooling air, the melt of the leaf cools quickly, while the rest of the trilobal spinneret hole cools slowly, which is more easily drawn and thinner under the tension of drafting, and its stress is more concentrated, so that in the trilobal cross-section of the fiber, there will be a structure of asymmetric stress of three leaves, wherein the fiber with asymmetric stress in the cross-section has the three-dimensional crimp shape during heat treatment or stretching, and curls well with a high fiber elastic recovery rate.

The following preferred technology program is presented to give a detailed description for this invention.

In the preparing method of the degradable polyester fiber, wherein the PET melt has an intrinsic viscosity of 0.60-0.66 dL/g;

wherein the FDY process involves technological parameters: a spinning temperature of 280-285° C., a cooling temperature of 20-25° C., a cooling wind speed of 1.80-2.30 m/s, a godet roller 1 speed of 1800-2000 m/min, a godet roller 1 temperature of 85-95° C., a godet roller 2 speed of 3500-3700 m/min, a godet roller 2 temperature of 160-180° C., and a winding speed of 3430-3610 m/min;

wherein the content of doped $ZrO_2$ powder in PET is 0.03-0.06 wt %;

wherein the $M^{x+}$ solution is an aqueous solution with a concentration of 1-2 wt % and the anion is $NO_3^-$; wherein the $Zr^{4+}$ solution is a product of dissolving 20-25 wt % of $ZrO_2$ in nitric acid; wherein the precipitant is ammonia water with a concentration of 2 mol/L; wherein the solution blending before the coprecipitation is to make a mixture containing (5-8):100 (molar ratio) of $M^{x+}$ respecting to $Zr^{4+}$;

wherein the calcining is preceded by a washing process and a drying process for the precipitate, and the drying process is carried out at a temperature of 105-110° C. for 2-3 h; wherein the calcining includes steps of a 400° C. heating for 2-3 h, a 700° C. heating for 1-2 h, and a cooling in air;

wherein the relaxation heat treatment has a temperature of 90-120° C., and a time of 20-30 min.

The following preferred technology program is presented to give a detailed description for the degradable polyester fiber, wherein the degradable polyester fiber is prepared by any one of the above methods, with a three-dimensional crimp shape, and comprises a plurality of PET monofilaments containing doped $ZrO_2$ powder in a trilobal cross-section.

Prepared through the preferred technology program mentioned above, wherein the degradable polyester fiber comprises mechanical performance indices: a crimp shrinkage of 22-26%, a crimp stability of 77-81%, a shrinkage elongation of 56-62%, and a crimp elastic recovery rate of 75-80%;

wherein the degradable polyester fiber comprises mechanical performance indices: a breaking strength ≥2.7 cN/dtex, an elongation at break of 45.0±5.0%, a total fineness of 100-150 dtex, and an intrinsic viscosity drop of 10-16% after a storage at 25° C. and a R.H. 65% for 60 months.

Benefits (1) The method for preparing a degradable polyester fiber in the present invention has easy technologies, wherein the natural degradation performance of the fiber is significantly improved by introducing the doped $ZrO_2$ powder;

(2) The method for preparing a degradable polyester fiber in the present invention has low costs and promising applications;

(3) The degradable polyester fiber in the present invention has excellent degradability and good elasticity.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

The crimp shrinkage and crimp stability in the present invention are obtained by testing the tow by using GB6506-2001 "Synthetic fiber—Test method for crimp contraction properties of textured filament yarns";

The text methods of the shrinkage elongation (reflecting the degree of elasticity and crimp of textured filament yarns, wherein the fibers are subjected to a light load and then to a heavy load, and the ratio of the difference in length to the curl length is calculated for both loads) and the crimp elastic recovery rate are as follows:

Firstly, cut two fiber samples of about 50 cm in length, put them into 100° C. hot water for 30 minutes, take them out and dry them naturally, next intercept a sample of about 30 cm in length, wherein fix one end and load another end with a load of 0.0018 cN/dtex for 30 seconds, and mark it at 20 cm, that is, the initial length $l_1$ of the sample; then load another end with a load of 0.09 cN/dtex for 30 seconds, and measure the position of the marked point, which is the length $l_2$ of the sample under heavier load; finally remove the load and let the sample retract for 2 minutes, next add a load of 0.0018 cN/dtex for 30 seconds and measure the position of the marked point, which is the recovery length $l_3$; the shrinkage elongation (CE) and the crimp elastic recovery rate (SR) are calculated as follows:

$$CE=(l_2-l_1)/l_1;$$

$$SR=(l_2-l_3)/(l_2-l_1).$$

Figure 1:
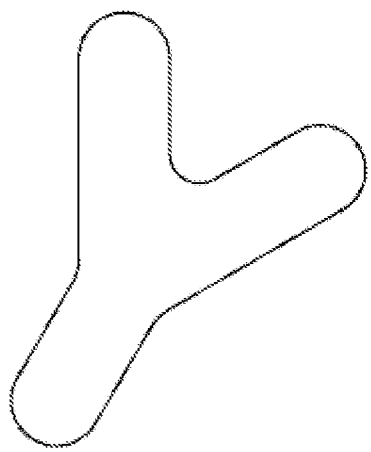
FIG. 1 is a schematic diagram of the structure of the trilobal spinneret hole in the present invention.
Figure 2:
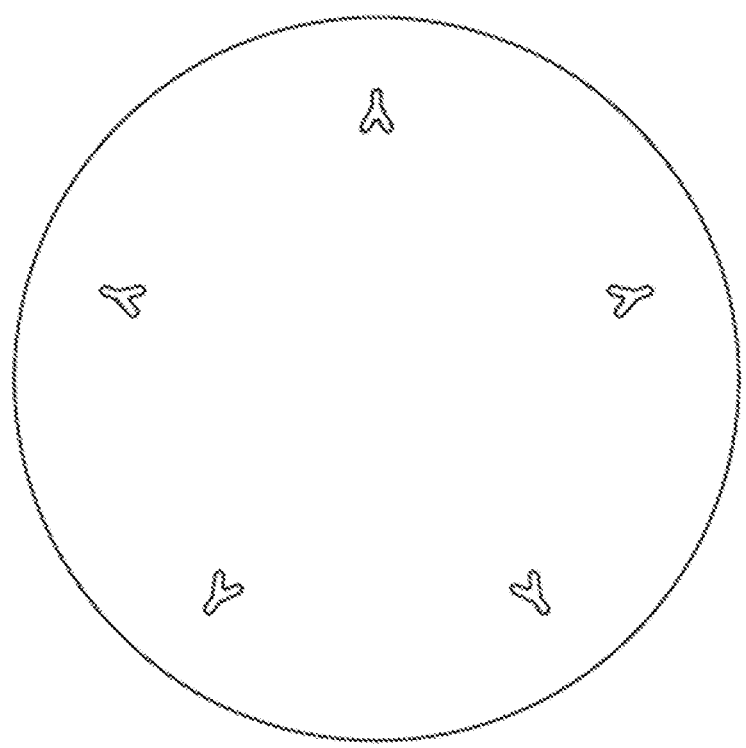
FIG. 2 is a schematic diagram of the distribution of the trilobal spinneret holes on a spinneret in the present invention.

The trilobal spinneret holes and their distribution on a spinneret in the present invention are shown in FIGS. 1-2; wherein a ratio of angles between centre lines of three leaves from the same trilobal spinneret hole is 1.0:(1.5-3.1):(1.5-3.1); wherein the ratio of lengths of two leaves forming the smallest angle to the length of the other leaf from the same trilobal spinneret hole is 3:3:2; wherein the ratio of the length to the width of the shortest leaf is (1.5-2):1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle. The figures are for illustration only and should not be construed as limiting the present invention.

Example 1

A method for preparing a degradable polyester fiber is to cool a PET melt with an intrinsic viscosity of 0.6 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.03 wt % of doped $ZrO_2$ powder, wherein the process of doping is evenly mixing the 1 wt % of $Mg(NO_3)_2$ aqueous solution and the 20 wt % of $ZrO_2$ nitric acid solution in a molar ratio 5:100 of $Mg^{2+}$ and $Zr^{4+}$; then depositing the mixed solution by dripping in 2 mol/L of ammonia water till pH=9, and washing and drying (at 105° C. for 2 h) the precipitate; after the treatments including a heating at 400° C. for 2 h, a heating at 700° C. for 1 h and a cooling in air, finally calcining the precipitate;

wherein a ratio of angles between centre lines of three leaves from the same trilobal spinneret hole is 1.0:1.5:1.5; wherein the ratio of lengths of two leaves forming the smallest angle to the length of the other leaf from the same trilobal spinneret hole is 3:3:2; wherein the ratio of the length to the width of the shortest leaf is 1.5:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 280° C., a cooling temperature of 20° C., a cooling wind speed of 1.8 m/s, a godet roller 1 speed of 1800 m/min, a godet roller 1 temperature of 85° C., a godet roller 2 speed of 3500 m/min, a godet roller 2 temperature of 160° C., and a winding speed of 3430 m/min;

wherein the relaxation heat treatment has a temperature of 90° C., and a time of 30 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 22%, a crimp stability of 77%, a shrinkage elongation of 56%, and a crimp elastic recovery rate of 75%, a breaking strength of 2.7 cN/dtex, an elongation at break of 50%, a total fineness of 100 dtex, and an intrinsic viscosity drop of 10% after a storage at 25° C. and a R.H. 65% for 60 months.

Example 2

A method for preparing a degradable polyester fiber is to cool a PET melt with an intrinsic viscosity of 0.62 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.03 wt % of doped $ZrO_2$ powder, wherein the process of doping is evenly mixing the 1 wt % of $Mg(NO_3)_2$ aqueous solution and the 21 wt % of $ZrO_2$ nitric acid solution in a molar ratio 8:100 of $Mg^{2+}$ and $Zr^{4+}$; then depositing the mixed solution by dripping in 2 mol/L of ammonia water till pH=9, and washing and drying (at 105° C. for 2 h) the precipitate; after the treatments including a heating at 400° C. for 3 h, a heating at 700° C. for 2 h and a cooling in air, finally calcining the precipitate;

wherein a ratio of angles between centre lines of three leaves from the same trilobal spinneret hole is 1.0:1.5:1.5; wherein the ratio of lengths of two leaves forming the smallest angle to the length of the other leaf from the same trilobal spinneret hole is 3:3:2; wherein the ratio of the length to the width of the shortest leaf is 1.5:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 280° C., a cooling temperature of 21° C., a cooling wind speed of 1.8 m/s, a godet roller 1 speed of 1818 m/min, a godet roller 1 temperature of 93° C., a godet roller 2 speed of 3538 m/min, a godet roller 2 temperature of 163° C., and a winding speed of 3434 m/min;

wherein the relaxation heat treatment has a temperature of 92° C., and a time of 25 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 22%, a crimp stability of 77%, a shrinkage elongation of 57%, and a crimp elastic recovery rate of 75%, a breaking strength of 2.8 cN/dtex, an elongation at break of 50%, a total fineness of 146 dtex, and an intrinsic viscosity drop of 11% after a storage at 25° C. and a R.H. 65% for 60 months.

Example 3

A method for preparing a degradable polyester fiber is to cool a PET melt with an intrinsic viscosity of 0.61 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.03 wt % of doped $ZrO_2$ powder, wherein the process of doping is evenly mixing the 1 wt % of $LiNO_3$ aqueous solution and the 25 wt % of $ZrO_2$ nitric acid solution in a molar ratio 5:100 of $Li^+$ and $Zr^{4+}$; then depositing the mixed solution by dripping in 2 mol/L of ammonia water till pH=9, and washing and drying (at 105° C. for 2 h) the precipitate; after the treatments including a heating at 400° C. for 2 h, a heating at 700° C. for 1 h and a cooling in air, finally calcining the precipitate;

wherein a ratio of angles between centre lines of three leaves from the same trilobal spinneret hole is 1.0:1.7:1.7; wherein the ratio of lengths of two leaves forming the smallest angle to the length of the other leaf from the same trilobal spinneret hole is 3:3:2; wherein the ratio of the length to the width of the shortest leaf is 1.5:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 281° C., a cooling temperature of 23° C., a cooling wind speed of 1.8 m/s, a godet roller 1 speed of 1851 m/min, a godet roller 1 temperature of 93° C., a godet roller 2 speed of 3542 m/min, a godet roller 2 temperature of 166° C., and a winding speed of 3483 m/min;

wherein the relaxation heat treatment has a temperature of 93° C., and a time of 25 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 24%, a crimp stability of 78%, a shrinkage elongation of 57%, and a crimp elastic recovery rate of 75%, a breaking strength of 2.8 cN/dtex, an elongation at break of 49.7%, a total fineness of 143 dtex, and an intrinsic viscosity drop of 12% after a storage at 25° C. and a R.H. 65% for 60 months.

Example 4

A method for preparing a degradable polyester fiber is to cool a PET melt with an intrinsic viscosity of 0.62 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.04 wt % of doped $ZrO_2$ powder, wherein the process of doping is evenly mixing the 2 wt % of $LiNO_3$ aqueous solution and the 20 wt % of $ZrO_2$ nitric acid solution in a molar ratio 8:100 of $Li^+$ and $Zr^{4+}$; then depositing the mixed solution by dripping in 2 mol/L of ammonia water till pH=9, and washing and drying (at 107° C. for 2 h) the precipitate; after the treatments including a heating at 400° C. for 3 h, a heating at 700° C. for 1 h and a cooling in air, finally calcining the precipitate;

wherein a ratio of angles between centre lines of three leaves from the same trilobal spinneret hole is 1.0:1.9:1.9; wherein the ratio of lengths of two leaves forming the smallest angle to the length of the other leaf from the same trilobal spinneret hole is 3:3:2; wherein the ratio of the length to the width of the shortest leaf is 1.8:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 283° C., a cooling temperature of 23° C., a cooling wind speed of 1.9 m/s, a godet roller 1 speed of 1905 m/min, a godet roller 1 temperature of 93° C., a godet roller 2 speed of 3556 m/min, a godet roller 2 temperature of 169° C., and a winding speed of 3492 m/min;

wherein the relaxation heat treatment has a temperature of 97° C., and a time of 24 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 24%, a crimp stability of 79%, a shrinkage elongation of 58%, and a crimp elastic recovery rate of 76%, a breaking strength of 2.8 cN/dtex, an elongation at break of 47.2%, a total fineness of 142 dtex, and an intrinsic viscosity drop of 12% after a storage at 25° C. and a R.H. 65% for 60 months.

Example 5

A method for preparing a degradable polyester fiber is to cool a PET melt with an intrinsic viscosity of 0.62 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.04 wt % of doped $ZrO_2$ powder, wherein the process of doping is evenly mixing the 1 wt % of $Zn(NO_3)_2$ aqueous solution and the 25 wt % of $ZrO_2$ nitric acid solution in a molar ratio 6:100 of $Zn^{2+}$ and $Zr^{4+}$; then depositing the mixed solution by dripping in 2 mol/L of ammonia water till pH=10, and washing and drying (at 108° C. for 2 h) the precipitate; after the treatments including a heating at 400° C. for 2 h, a heating at 700° C. for 2 h and a cooling in air, finally calcining the precipitate;

wherein a ratio of angles between centre lines of three leaves from the same trilobal spinneret hole is 1.0:1.9:1.9; wherein the ratio of lengths of two leaves forming the smallest angle to the length of the other leaf from the same trilobal spinneret hole is 3:3:2; wherein the ratio of the length to the width of the shortest leaf is 1.8:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 284° C., a cooling temperature of 23° C., a cooling wind speed of 2.1 m/s, a godet roller 1 speed of 1905 m/min, a godet roller 1 temperature of 94° C., a godet roller 2 speed of 3572 m/min, a godet roller 2 temperature of 173° C., and a winding speed of 3519 m/min;

wherein the relaxation heat treatment has a temperature of 101° C., and a time of 23 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 25%, a crimp stability of 80%, a shrinkage elongation of 58%, and a crimp elastic recovery rate of 76%, a breaking strength of 2.8 cN/dtex, an elongation at break of 47.2%, a total fineness of 148 dtex, and an intrinsic viscosity drop of 13% after a storage at 25° C. and a R.H. 65% for 60 months.

Example 6

A method for preparing a degradable polyester fiber is to cool a PET melt with an intrinsic viscosity of 0.65 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.05 wt % of doped $ZrO_2$ powder, wherein the process of doping is evenly mixing the 1 wt % of $Zn(NO_3)_2$ aqueous solution and the 25 wt % of $ZrO_2$ nitric acid solution in a molar ratio 5:100 of $Zn^{2+}$ and $Zr^{4+}$; then depositing the mixed solution by dripping in 2 mol/L of ammonia water till pH=10, and washing and drying (at 110° C. for 2 h) the precipitate; after the treatments including a heating at 400° C. for 2 h, a heating at 700° C. for 2 h and a cooling in air, finally calcining the precipitate;

wherein a ratio of angles between centre lines of three leaves from the same trilobal spinneret hole is 1.0:2.5:2.5; wherein the ratio of lengths of two leaves forming the smallest angle to the length of the other leaf from the same trilobal spinneret hole is 3:3:2; wherein the ratio of the length to the width of the shortest leaf is 2:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 284° C., a cooling temperature of 23° C., a cooling wind speed of 2.3 m/s, a godet roller 1 speed of 1946 m/min, a godet roller 1 temperature of 95° C., a godet roller 2 speed of 3576 m/min, a godet roller 2 temperature of 174° C., and a winding speed of 3554 m/min;

wherein the relaxation heat treatment has a temperature of 101° C., and a time of 21 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 25%, a crimp stability of 80%, a shrinkage elongation of 59%, and a crimp elastic recovery rate of 78%, a breaking strength of 3 cN/dtex, an elongation at break of 46.2%, a total fineness of 135 dtex, and an intrinsic viscosity drop of 14% after a storage at 25° C. and a R.H. 65% for 60 months.

Example 7

A method for preparing a degradable polyester fiber is to cool a PET melt with an intrinsic viscosity of 0.63 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.05 wt % of doped $ZrO_2$ powder, wherein the process of doping is evenly mixing the 1 wt % of $Mg(NO_3)_2$ aqueous solution and the 24 wt % of $ZrO_2$ nitric acid solution in a molar ratio 8:100 of $Mg^{2+}$ and $Zr^{4+}$; then depositing the mixed solution by dripping in 2 mol/L of ammonia water till pH=10, and washing and drying (at 110° C. for 3 h) the precipitate; after the treatments including a heating at 400° C. for 3 h, a heating at 700° C. for 1 h and a cooling in air, finally calcining the precipitate;

wherein a ratio of angles between centre lines of three leaves from the same trilobal spinneret hole is 1.0:3.1:3.1; wherein the ratio of lengths of two leaves forming the smallest angle to the length of the other leaf from the same trilobal spinneret hole is 3:3:2; wherein the ratio of the length to the width of the shortest leaf is 2:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 285° C., a cooling temperature of 24° C., a cooling wind speed of 2.3 m/s, a godet roller 1 speed of 1992 m/min, a godet roller 1 temperature of 95° C., a godet roller 2 speed of 3619 m/min, a godet roller 2 temperature of 179° C., and a winding speed of 3581 m/min;

wherein the relaxation heat treatment has a temperature of 119° C., and a time of 20 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 26%, a crimp stability of 81%, a shrinkage elongation of 62%, and a crimp elastic recovery rate of 80%, a breaking strength of 3 cN/dtex, an elongation at break of 40.1%, a total fineness of 136 dtex, and an intrinsic viscosity drop of 15% after a storage at 25° C. and a R.H. 65% for 60 months.

Example 8

A method for preparing a degradable polyester fiber is to cool a PET melt with an intrinsic viscosity of 0.66 dL/g by ring-blowing after extruded from a trilobal spinneret hole on a spinneret, and manufacture an FDY according to an FDY process with the PET melt, then the degradable polyester fiber is prepared after a relaxation heat treatment;

wherein the PET melt is dispersed with 0.06 wt % of doped $ZrO_2$ powder, wherein the process of doping is evenly mixing the 2 wt % of $Mg(NO_3)_2$ aqueous solution and the 25 wt % of $ZrO_2$ nitric acid solution in a molar ratio 8:100 of $Mg^{2+}$ and $Zr^{4+}$; then depositing the mixed solution by dripping in 2 mol/L of ammonia water till pH=10, and washing and drying (at 110° C. for 3 h) the precipitate; after the treatments including a heating at 400° C. for 3 h, a heating at 700° C. for 2 h and a cooling in air, finally calcining the precipitate;

wherein a ratio of angles between centre lines of three leaves from the same trilobal spinneret hole is 1.0:3.1:3.1; wherein the ratio of lengths of two leaves forming the smallest angle to the length of the other leaf from the same trilobal spinneret hole is 3:3:2; wherein the ratio of the length to the width of the shortest leaf is 2:1, with the same widths of other two leaves from the same trilobal spinneret hole; wherein the shapes and sizes of three leaves from different trilobal spinneret holes are the same; wherein all the trilobal spinneret holes are distributed in concentric circles, with a center line of the leaf opposite to the smallest angle in each trilobal spinneret hole passing through the center of the circle, and pointing away from the center of the circle;

wherein the FDY process involves technological parameters: a spinning temperature of 285° C., a cooling temperature of 25° C., a cooling wind speed of 2.3 m/s, a godet roller 1 speed of 2000 m/min, a godet roller 1 temperature of 95° C., a godet roller 2 speed of 3700 m/min, a godet roller 2 temperature of 180° C., and a winding speed of 3610 m/min;

wherein the relaxation heat treatment has a temperature of 120° C., and a time of 20 minutes.

The prepared degradable polyester fiber has a three-dimensional crimp shape, and comprises a plurality of PET monofilaments containing doped $ZrO_2$ powder in a trilobal cross-section; wherein the degradable polyester fiber comprises mechanical performance indices: a crimp shrinkage of 26%, a crimp stability of 81%, a shrinkage elongation of 62%, and a crimp elastic recovery rate of 80%, a breaking strength of 3 cN/dtex, an elongation at break of 40%, a total fineness of 150 dtex, and an intrinsic viscosity drop of 16% after a storage at 25° C. and a R.H. 65% for 60 months.

What is claimed is:

1. A method for preparing a degradable polyester fiber, comprising: cooling a polyethylene terephthalate (PET) melt by ring-blowing after extruded from a trilobal spinneret hole on a spinneret; then manufacturing a fully drawn yarn (FDY) according to an FDY process with the PET melt; and performing a relaxation heat treatment to obtain the degradable polyester fiber;

wherein the PET melt disperses with a doped $ZrO_2$ powder, the doped $ZrO_2$ powder is obtained through a process of evenly mixing a $M^{x+}$ solution and a $Zr^{4+}$ solution at first, then dripping in a precipitant until a pH value is 9-10 to obtain a precipitate, and finally calcining the precipitate; wherein $M^{x+}$ in the $M^{x+}$ solution is more than one ion selected from the group consisting of $Mg^{2+}$, $Li^+$, and $Zn^{2+}$;

wherein a ratio of angles between center lines of three leaves from a same trilobal spinneret hole is 1.0:(1.5-3.1):(1.5-3.1); wherein the three leaves from the same trilobal spinneret hole comprise a first leaf, a second leaf, and a third leave; wherein a ratio of lengths of the first leaf and the second leaf forming a smallest angle to a length of the third leaf from the same trilobal spinneret hole is 3:3:2; wherein a ratio of a length to a width of the third leaf that is a shortest leaf of the three leaves of the same trilobal spinneret hole is (1.5-2):1 with of other two leaves of the same trilobal spinneret hole having same widths; wherein shapes and sizes of three leaves from different trilobal spinneret holes are the same;

wherein all the trilobal spinneret holes are distributed in concentric circles with a center line of a leaf opposite to the smallest angle in each trilobal spinneret hole passing through a center of the concentric circles and pointing away from the center of the concentric circles;

wherein the FDY process comprises a cooling temperature of 20-25° C. and a cooling wind speed of 1.80-2.30 m/s.

2. The method of claim 1, wherein the PET melt has an intrinsic viscosity of 0.60-0.66 dL/g.

3. The method of claim 2, wherein the FDY process further comprises a spinning temperature of 280-285° C., a first godet roller speed of 1800-2000 m/min, a first godet roller temperature of 85-95° C., a second godet roller speed of 3500-3700 m/min, a second godet roller temperature of 160-180° C., and a winding speed of 3430-3610 m/min.

4. The method of claim 1, wherein a content of the doped $ZrO_2$ powder in the PET melt is 0.03-0.06 wt %.

5. The method of claim 4, wherein the $M^{x+}$ solution is an aqueous solution with a concentration of 1-2 wt % and an anion in the $M^{x+}$ solution is $NO_3^-$; wherein the $Zr^{4+}$ solution is a product of dissolving 20-25 wt % of $ZrO_2$ in nitric acid; wherein the precipitant is ammonia water with a concentration of 2 mol/L; wherein a solution blending before a coprecipitation is to make a mixture containing (5-8):100 (molar ratio) of $M^{x+}$ respecting to $Zr^{4+}$.

6. The method of claim 5, wherein the calcining is preceded by a washing process and a drying process for the precipitate, and the drying process is carried out at a temperature of 105-110° C. for 2-3 h; wherein the calcining includes steps of a 400° C. heating for 2-3 h, a 700° C. heating for 1-2 h, and a cooling in air.

7. The method of claim 1, wherein the relaxation heat treatment has a temperature of 90-120° C. and a time of 20-30 min.

8. A degradable polyester fiber, wherein the degradable polyester fiber is prepared by the method of claim 1, the degradable polyester fiber has a three-dimensional crimp shape, and comprises a plurality of PET monofilaments containing the doped $ZrO_2$ powder in a trilobal cross-section.

9. The degradable polyester fiber of claim 8, wherein the degradable polyester fiber comprises mechanical performance indices: a crimp shrinkage of 22-26%, a crimp stability of 77-81%, a shrinkage elongation of 56-62%, and a crimp elastic recovery rate of 75-80%.

10. The degradable polyester fiber of claim 8, wherein the degradable polyester fiber comprises mechanical performance indices: a breaking strength of ≥2.7 cN/dtex, an elongation at break of 45.0±5.0%, a total fineness of 100-150 dtex, and an intrinsic viscosity drop of 10-16% after a storage at 25° C. and a R.H. 65% for 60 months.

11. The degradable polyester fiber of claim 8, wherein during a preparation of the degradable polyester fiber, the PET melt has an intrinsic viscosity of 0.60-0.66 dL/g.

12. The degradable polyester fiber of claim 11, wherein during the preparation of the degradable polyester fiber, the FDY process comprises a spinning temperature of 280-285° C., a first godet roller speed of 1800-2000 m/min, a first godet roller temperature of 85-95° C., a second godet roller speed of 3500-3700 m/min, a second godet roller temperature of 160-180° C., and a winding speed of 3430-3610 m/min.

13. The degradable polyester fiber of claim 8, wherein during a preparation of the degradable polyester fiber, a content of the doped $ZrO_2$ powder in the PET melt is 0.03-0.06 wt %.

14. The degradable polyester fiber of claim 13, wherein during the preparation of the degradable polyester fiber, the $M^{x+}$ solution is an aqueous solution with a concentration of 1-2 wt % and an anion in the $M^{x+}$ solution is $NO_3^-$; wherein the $Zr^{4+}$ solution is a product of dissolving 20-25 wt % of $ZrO_2$ in nitric acid; wherein the precipitant is ammonia water with a concentration of 2 mol/L; wherein a solution blending before a coprecipitation is to make a mixture containing (5-8):100 (molar ratio) of $M^{x+}$ respecting to $Zr^{4+}$.

15. The degradable polyester fiber of claim 14, wherein during the preparation of the degradable polyester fiber, the calcining is preceded by a washing process and a drying process for the precipitate, and the drying process is carried out at a temperature of 105-110° C. for 2-3 h; wherein the calcining includes steps of a 400° C. heating for 2-3 h, a 700° C. heating for 1-2 h, and a cooling in air.

16. The degradable polyester fiber of claim 8, wherein during a preparation of the degradable polyester fiber, the relaxation heat treatment has a temperature of 90-120° C. and a time of 20-30 min.

* * * * *